FIG.1.

April 4, 1944. M. B. MENTLEY ET AL 2,345,986
CUTTER MANUFACTURE
Filed May 9, 1941 6 Sheets-Sheet 3

FIG. 5.

INVENTORS
MAX B. MENTLEY
DONALD D. AUSTIN
BY Whittemore, Hulbert & Belknap
ATTORNEYS

April 4, 1944.　　M. B. MENTLEY ET AL　　2,345,986
CUTTER MANUFACTURE
Filed May 9, 1941　　6 Sheets-Sheet 6

INVENTORS
MAX B. MENTLEY
BY　DONALD D. AUSTIN
ATTORNEYS

Patented Apr. 4, 1944

2,345,986

UNITED STATES PATENT OFFICE 2,345,986

CUTTER MANUFACTURE

Max B. Mentley and Donald D. Austin, Detroit, Mich., assignors to National Broach & Machine Company, Detroit, Mich., a corporation of Michigan Application May 9, 1941, Serial No. 392,790

18 Claims. (Cl. 51—95)

The present invention relates to a grinding machine and more particularly to a machine adapted to grind milling cutters.

Due to its flexibility, the present machine may properly be regarded as an all-purpose grinding machine, but it will be explained with particular reference to the grinding of milling cutters, either bevel or cylindrical.

It is an object of the present invention to provide a grinding machine in which the grinder is adjustable vertically and angularly about a vertical axis, and in which the work spindle is adjustable horizontally toward and away from the grinding spindle, and is adjustable angularly about a horizontal axis perpendicular to the axis of the work spindle, and is mounted for traverse in a horizontal plane.

It is a further object of the present invention to provide a grinder having a grinder spindle support mounted for angular adjustment, and movable trimming mechanism mounted directly on said support.

It is a further object of the present invention to provide, in a machine of the class described, a work spindle of novel characteristics.

More particularly, it is a further object of the present invention to provide a work spindle mounted for traverse in combination with generating means for rotating said spindle in accordance with its traverse, in combination with a coil spring biasing said spindle in one direction.

It is a further object of the present invention to provide a work supporting spindle having novel clamping indexing means.

Other objects of the invention will be apparent as the description proceeds, and when taken in conjunction with the accompanying drawings, wherein:

Figure 1:
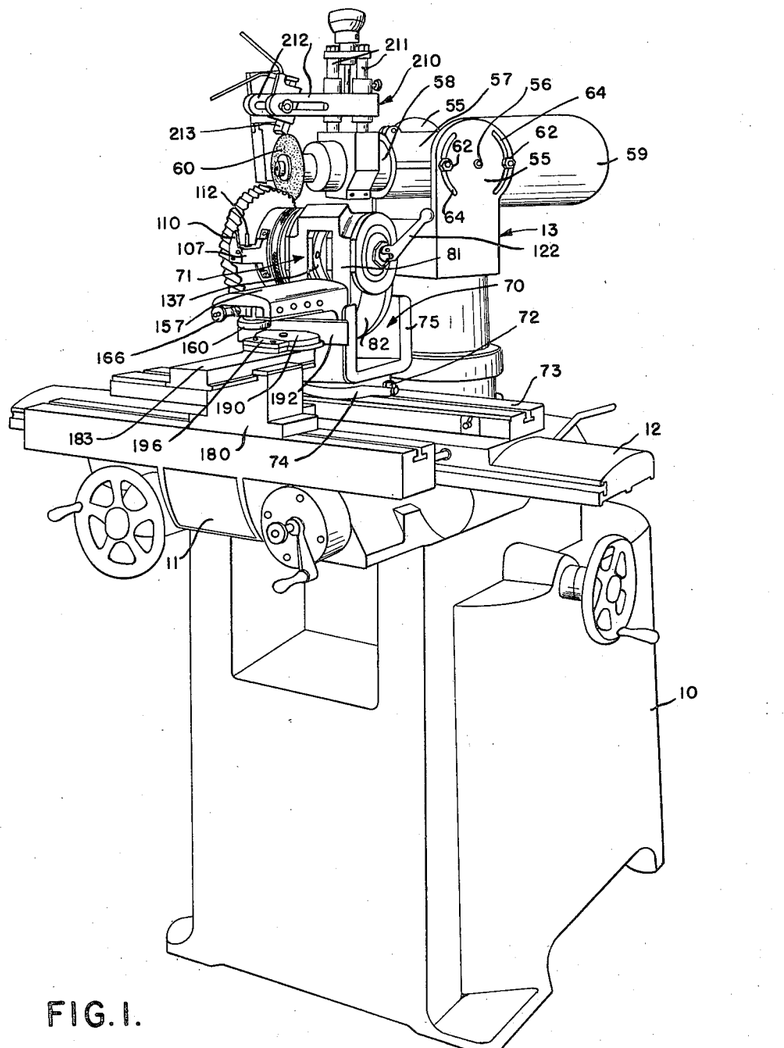
Figure 1 is a perspective of the complete grinding machine.

Referring first to Figure 1, the grinding machine comprises a base 10 which is a heavy, rigid casting, an intermediate work table 11 which is mounted for horizontal adjustment from front to back of the machine, a work slide 12 mounted on the intermediate table 11 for traverse from side to side, and a tool or grinding wheel support 13 which is adjustable, as will later be described.

Adjustment of the intermediate table 11 from front to back is accomplished by handwheels through conventional gearing, and traverse of the work slide 12 from right to left is likewise accomplished by conventional transmission means connected to a handwheel.

Figures 2, 3, 4:
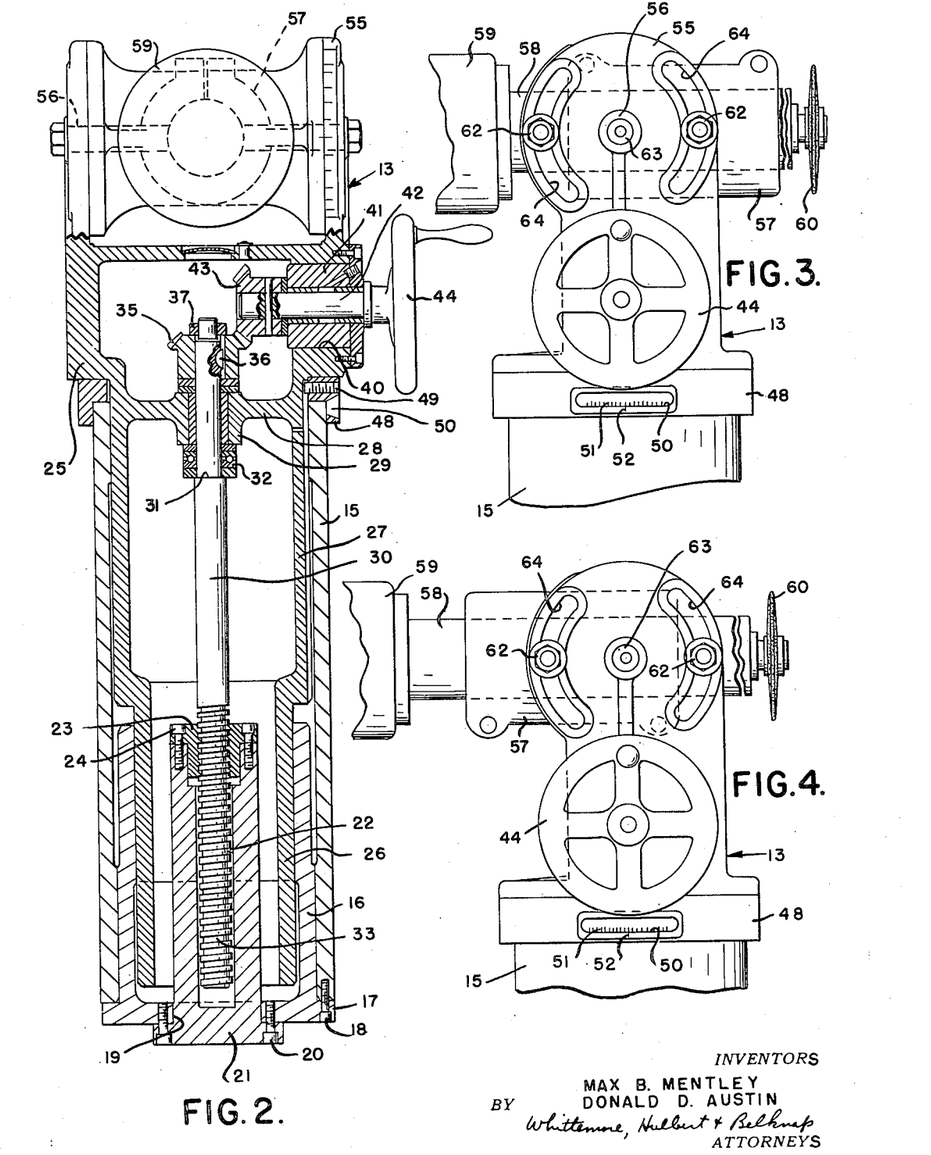
Figure 2 is a fragmentary vertical section illustrating vertical adjustment of the cutter spindle.
Figures 3 and 4 are fragmentary side elevations of the grinder spindle showing the same in two different positions.

Referring now to Figures 2 to 4, we illustrate in Figure 2 a vertical section through the support for the tool spindle. Formed in the frame of the machine 10 is a cylindrical recess or well 15, which is closed at its bottom by a member 16 having a flange 17 bolted or otherwise secured to the open bottom of the cylindrical frame portion 15, as indicated at 18. Member 16 is provided with an opening 19 at its bottom in which is bolted or otherwise secured, as indicated at 20, a member 21 provided with an internal cylindrical bore 22, and adapted to have at its upper portion a nut 23 bolted or otherwise secured thereto as indicated at 24. A supporting casting indicated generally at 25 has a lower cylindrical portion 26 received in slidable relation within member 16 and an upper reduced cylindrical portion 27 slidably received within portion 15 of the frame. A web 28 having a centrally apertured boss 29 is provided in the casting 25. A vertical feed screw 30 extends through the boss 29. Beneath the boss 29 the feed screw is shouldered as indicated at 31, and intermediate the shoulder 31 and the boss 29 is a bearing 32. The weight of the casting 25 and mechanism supported thereby is received on the shoulder 31, and vertical adjustment of the screw 30 is transmitted to the casting 25 and the parts supported thereby. The lower portion of the screw 30 is threaded as indicated at 33 and is received in threaded relation within the nut 23.

Secured on the upper reduced portion of the screw 30 is a bevel gear 35, keyed or otherwise secured to the screw 30 as indicated at 36. Bevel gear 35 is retained against longitudinal displacement on the screw 30 by means of a nut 37.

Casting 25 has a lateral opening 40 adapted to receive a block 41 which is bored to receive a shaft 42. Shaft 42 carries at its inner end a bevel gear 43 meshing with the bevel gear 35 previously described, and at its outer end is provided with a handwheel 44. Rotation of the handwheel 44 results in a corresponding rotation of the screw 30 and as a result of threaded relation between the lower end of the screw and the nut 23, this results in vertical movement of the casting 25 and associated parts.

The casting 25, in addition to being vertically adjustable in the frame portion 15, is also angularly adjustable about a vertical axis therein. At the upper portion of the well 15 is provided a collar 48 having a set screw 49 adapted to engage a keyway in the casting 25 and to hold the same against rotation within the well 15. The collar 48 is provided with an opening 50 through which the outer wall of the well 15 is visible, and if desired suitable graduations indicated at 51 may be located on the outer wall of the well 15 for cooperation with a similar index mark 52 in the opening 50. This will indicate the angular adjustment of the casting 25.

The casting 25 is provided with a pair of opposed plates 55 provided with central trunnion bearings 56 in which is mounted a split sleeve 57 which is adapted to clamp a spindle housing 58 for a grinder. Spindle housing 58 is connected to and supports a drive motor 59 at one end, which drives a grinding wheel 60 by means of a spindle extending through the spindle housing 58.

The sleeve 57 is provided at diametrically opposite sides with a pair of pins 63 adapted to be received within trunnion bearings 56 and to support the sleeve 57 in the bearings. Spaced from pins 63 in the sleeve 57 are a pair of diametrically opposed tapped openings for the reception of clamping bolts 62. The plates 55 are each provided with a pair of arcuate slots 64 through which are adapted to pass the clamping bolts 62 previously referred to. As seen in Figures 3 and 4, the pins 63 are located adjacent one end of the sleeve 57, and the arrangement is such that when the sleeve is reversed or swung through an arc of 180° about the pivot axis determined by the pins 63, the tapped openings previously referred to, for the reception of clamping bolts 62, will be aligned with the other of the arcuate slots 64. This results in a substantial displacement in a direction perpendicular to the axis of the casting 25. In addition, as will be appreciated, the grinding wheel 60 may be adjusted horizontally in a direction parallel to the axis by adjustment of the spindle housing 58 in the sleeve 57. The reversibility of the sleeve 57 referred to extends the range of adjustment obtainable a considerable degree.

Figure 5:
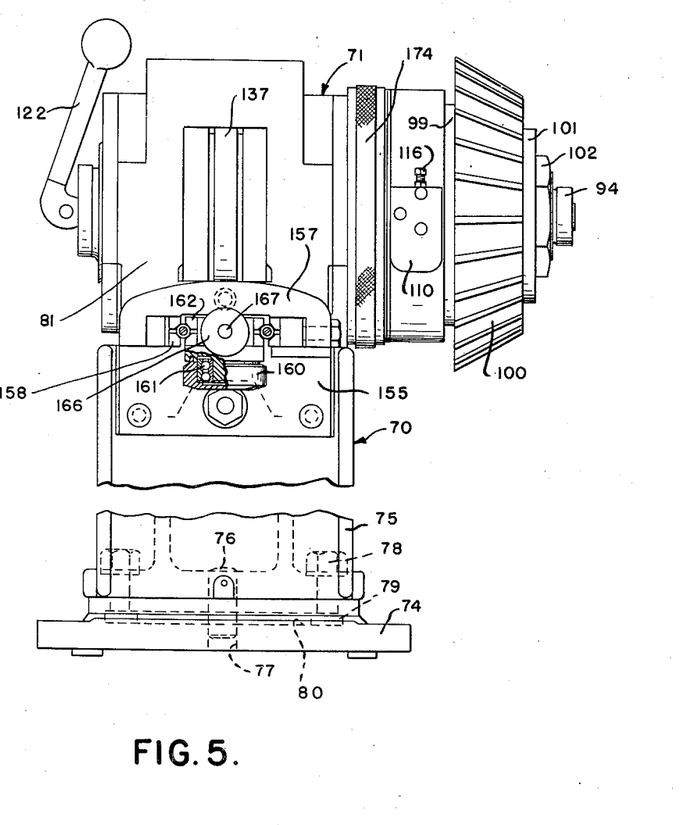
Figure 5 is a detail elevation of the work spindle, with parts broken away.
Figure 9:
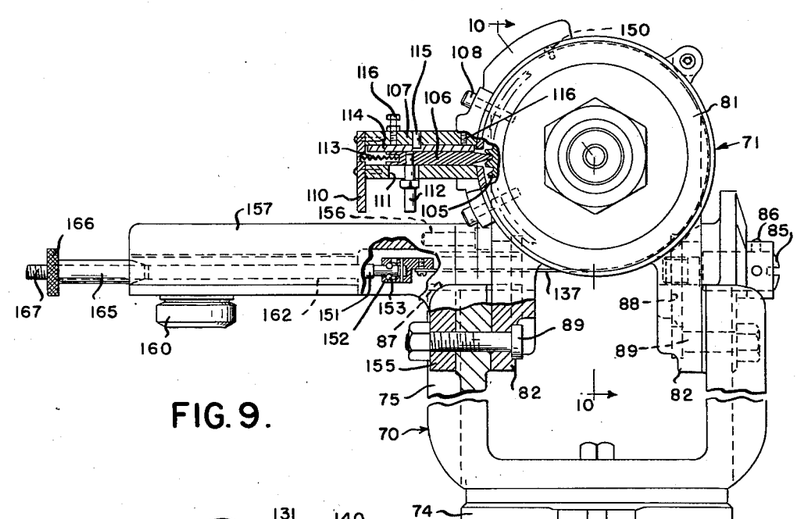
Figure 9 is an end elevation of the work spindle and support, with parts broken away.
Figure 10:
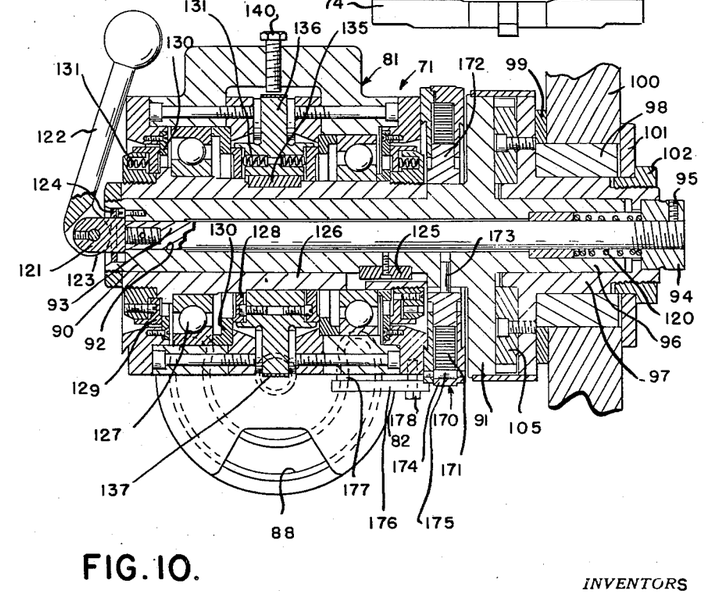
Figure 10 is a section on the line 10—10, Figure 9.

Referring now particularly to Figures 5, 9 and 10, we have indicated at 70 adjustable supporting means for the work spindle comprising a base plate 74 and a U-shaped bracket 75. The base plate 74 is adapted to be bolted or otherwise rigidly clamped as indicated at 72 in ways 73 formed in a portion of the work slide 12, as seen in Figure 1, and the U-shaped bracket or yoke 75 is secured to the base 74 for adjustment about a vertical axis established by a dowel pin 76 passing through a central opening at the bottom of the bracket 75 and seated within a similar recess indicated at 77 in the base 74. Clamping bolts 78 have heads 79 received within circular ways indicated at 80 and are adapted to clamp the bracket 75 in any position of adjustment.

The tool spindle 71 includes a main casting 81 provided with depending ears 82. A trunnion connection between the bracket 75 and the casting 81 is established by means of a bolt 85 passing through an opening in one of the arms of the yoke 75 and extending into a corresponding opening in one of the ears 82. The bolt 85 is adapted to be locked in position by means of a set screw indicated at 86. The opposite pivot point of the trunnion connection is established by means of a sleeve 87, the sleeve 87 being provided for the passage of a tape, later to be described. In order to lock the spindle assembly 71 in any position of adjustment about the axis of the trunnion connection just described, arcuate slots 88 are provided in the depending ears 82 and are adapted to receive locking bolts 89 passing through openings in the arms of the yoke 75.

The spindle assembly 71 is best seen in Figure 10, to which reference is now made. The main casting 81, of which the depending ears 82 are a part, is centrally bored to receive the component parts of the spindle assembly in assembled relation.

The spindle proper is designated by the numeral 90 and is provided with a radially extending flange 91. The spindle 90 is centrally bored, as indicated at 92, for the reception of a locking rod 93 which is longitudinally slidable therein. The rod 93, at one end, is provided with a nut 94, threaded thereon and clamped in assembled position by means of a set screw 95. The righthand end of the spindle 90, as seen in Figure 10, is reduced, as indicated at 96, and a flanged sleeve 97 is slidable thereon. The flanged sleeve 97 is illustrated in Figure 10 as provided with annular spacers 98 and 99, and the work piece 100 is clamped thereon, a washer 101 being urged against the work piece 100 by means of a clamping nut 102. This locks the work piece 100 rigidly on the sleeve 97.

The sleeve 97 has bolted or otherwise secured thereto an index member or gear 105 which is adapted to cooperate with an index finger 106 shown in Figure 9. The index finger 106 is slidably retained within an index housing 107 which is bolted to the spindle flange 91 as indicated at 108. The housing 107 is closed at its outboard end by means of a plate 110 and is provided with an elongated slot 111 through which passes an operating finger 112 rigidly secured to the index finger 106. A compression spring 113 seats in a recess of the plate 110 and a corresponding recess of the index finger 106 and urges the finger into a tooth space of the index plate 105.

In order to position the index finger 106 positively against transverse displacement, we provide an adjustable plate 114 in the index housing 107. A pin 115 retains the plate 114 against longitudinal movement and the plate 114 may be adjusted into guiding contact with the index finger 106 by bolts 116.

The index plate 105 and the flanged sleeve 97 are mounted for rotation on the spindle 90, the index plate 105 being in juxtaposition to the flange 91. Means are provided for clamping the index plate 105 against the flange 91 in order to prevent relative rotation between the spindle 90 and the work piece 100. Referring specifically to Figure 10, the locking rod 93 is urged to the right, as seen in Figure 10, by means of a compression spring 120, thus tending to prevent clamping or locking engagement between the index plate 105 and the flange 91. At the opposite end of the locking rod 93 we secure a member 121 to which is pivoted a locking lever 122 which has a camming surface 123 engageable with a plate 124 set within a recess at the end of the spindle 90. When the lever 122 is swung in a counterclockwise direction, as seen in this figure, it urges the locking rod 93 to the left and moves the sleeve 97 and the index plate 105 to the left relative to spindle 90. This produces tight frictional contact between the flange 91 of the spindle and the index plate 105, thus securing the parts together to prevent independent rotation.

Mounted on the spindle 90 and keyed thereto as indicated at 125 is a second sleeve 126. Intermediate the sleeve 126 and the spindle casting 81 are bearings indicated at 127. In order to prevent ingress of dust to the bearings 127 we provide a plurality of hardened rings 128 which are urged into contact with sealing rings 130 by means of springs 131.

The second sleeve 126, previously referred to, has keyed or otherwise secured thereto, as indicated at 135, a generating roll 136 to which is secured a tape 137, later to be described.

It will be observed that rotation imparted to the generating roll 136 by the tape 137 is transmitted to the second sleeve 126 by means of key 135 and is transmitted to the spindle 90 by means of key 125. If the lever 122 is in clamping position, rotation of the generating roll 136 will be imparted directly to the work piece 100. At this time, if the clamping lever 122 is in released position but the index finger 106 is engaged with the index plate 105, rotation of the generating roll 136 will likewise be effective to rotate the work piece 100.

A set screw 140 is threaded within the spindle casting 81 and is adapted to engage the base roll 136 or the tape 137 to lock the spindle 90 against rotation relative to the spindle casting 81.

Referring now particularly to Figure 9, we have indicated the tape 137 as secured to the generating roll 136 at 150. The other end of the tape 137 is connected to a plunger 151 by means of a swivel connection indicated generally at 152, the swivel connection including ball bearings 153, permitting relative swiveling motion between the swivel connection 152 and the plunger 151.

Referring now more particularly to Figures 5 and 9, a bracket 155 is bolted to one of the arms of the yoke 75 by the bolt 89 and by additional securing means 156. The bracket 155 includes an overarm 157 which is open along its underside to carry ball-bearing receiving ways indicated at 158, as seen in Figure 5. Slidable in the ways 158 is a carriage 162 which is provided with a depending roller 160 mounted for free rotation thereon by means of ball bearings 161. The plunger 151, which is pivotally secured to the member 152, is slidable in a bore in the carriage 162 and is adjusted relative thereto by means of an adjusting nut 165 having a knurled grip 166. The nut 165 is threaded over a portion 167 of the plunger 151. If the roller 160 is retained stationary, adjustment of the nut 165 will cause adjustment of the tape 137 relative thereto, thus imparting rotation to the generating roll 136 and associated parts. As will be appreciated, this is a fine adjustment for bringing a work piece carried by the spindle into proper relationship with the grinding wheel.

Referring again to Figure 10, spring means are provided for constantly biasing the spindle 90 in one direction or the other. This means takes the form of a coil spring of the phonograph type, indicated generally at 170. The spring proper 171 is secured at one end to a hub 172 which is keyed or otherwise secured to the spindle 90, as indicated at 173. The other end of the spring 171 is locked to a two-piece housing 174 by means of a pin 175. A locking member 176 having a pin 177 engaging in a recess in the spindle casting 81 is adapted to be clamped into locking engagement with the housing 174 by means of a bolt 178. In order to wind or tension the spring 171, clamping member 176 is released and the housing portion 174 is rotated in the proper direction to tension the spring, after which the locking member 176 is again tightened. The housing 174 of the spring is reversible so that by removing the same from the spindle 90 and reversing the same, tension may be applied to the spindle in either direction.

Figures 6, 8:
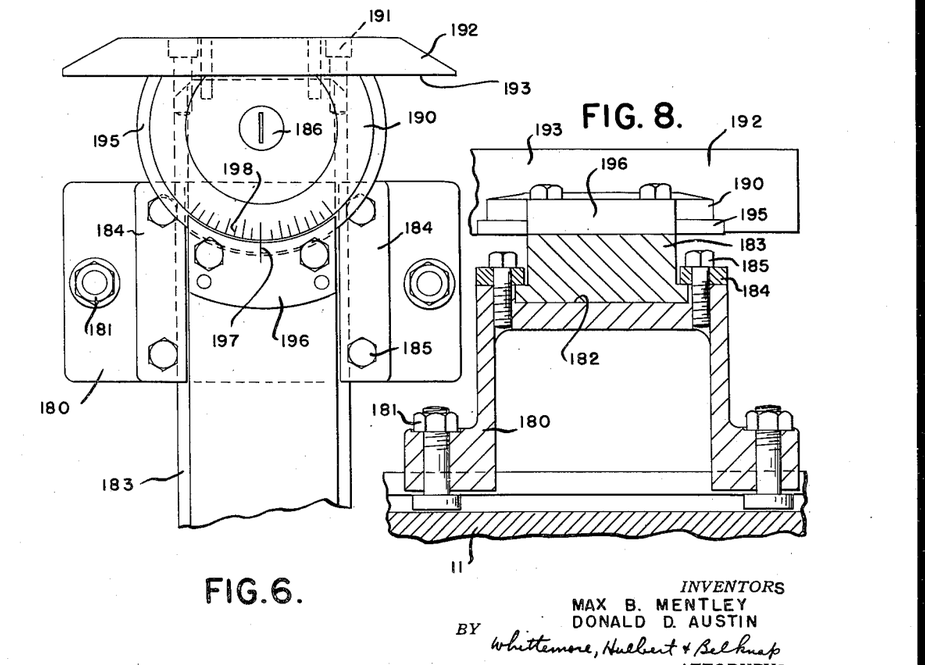
Figure 6 is a fragmentary plan view of part of the sine bar mechanism.
Figure 8 is a section on the line 8—8, Figure 7.
Figure 7:
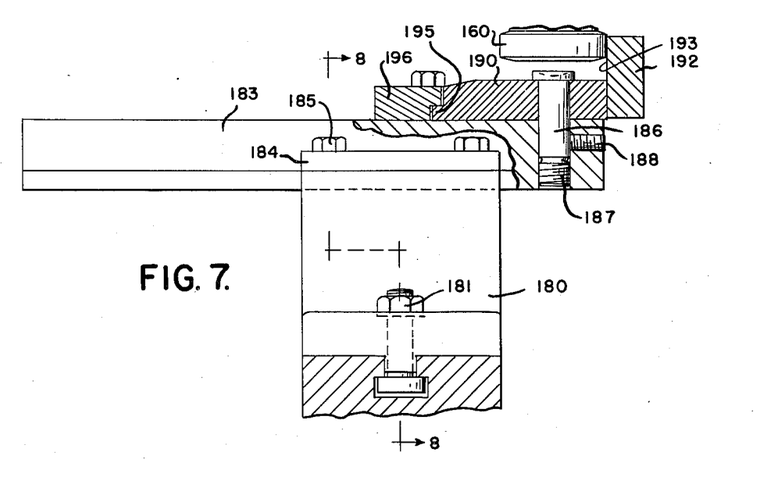
Figure 7 is a side elevation of the structure shown in Figure 6, with parts broken away.

A sine bar arrangement is provided for rotating the spindle 90, this arrangement including the roller 160 and other structure illustrated in detail in Figures 6 to 8.

Referring to these figures, a bracket 180 is bolted or otherwise secured to the intermediate support 11 by bolts 181. The bracket 180 has a groove 182 in its upper surface for the reception of a bar 183, the bar 183 being retained in the groove 182 by means of overhanging strips 184 bolted to the bracket 180 by bolts 185.

Adjacent the inboard end of the bar 183 is a dowel pin 186 threaded into the bar 183 as indicated at 187 and locked in position therein by means of a set screw 188. Dowel pin 186 establishes a pivot connection for a swivel plate 190, having bolted or otherwise secured thereto as indicated at 191 a sine bar 192. Sine bar 192 has an accurately machined surface 193 adapted to be engaged by the roller 160 previously referred to. Swivel plate 190 is provided with a radially extending flange 195 adapted to be received beneath an arcuate clamping member 196. By releasing the clamping member 196 the swivel plate 190 may be adjusted about the pivot axis of the dowel pin 186 to position the sine bar 192 at the desired angle. As best seen in Figure 6, the clamping member 196 is provided with an index mark 197 which is adapted to cooperate with indicia 198 formed on the swivel plate 190 to indicate the angularity of adjustment of the swivel plate and sine bar.

The apparatus described may be employed for a number of different operations and is so flexible that it is adaptable to perform all of the grinding operations necessary on the complete grinding of milling cutters, either cylindrical or conical, and having straight or helical teeth. By means of the apparatus described, it will also be possible to provide helical teeth on cylindrical or conical cutters in which the tops of the teeth are relieved in a helical path identical with the helical cutting edge of the teeth so that if desired a narrow land of absolute uniform width may be left directly at the rear of the cutting edge.

It has been found that for certain types of machining and more particularly for a machining operation known as surface shaving, it is desirable to provide milling cutters having helical teeth which are relieved back of the cutting edge, except for a very narrow land directly in rear of the cutting edge. So far as we are aware, the present machine is the only one available for performing this operation, either in the manufacture of new cutters or in the resharpening of used cutters.

Figure 11:
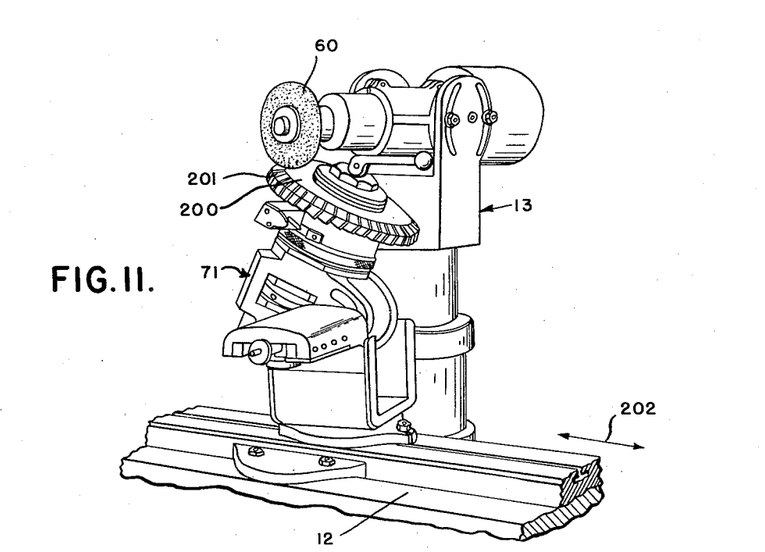
Figure 11 is a fragmentary perspective of the grinding machine illustrating the arrangement thereof for performing a different grinding operation.
Figure 12:
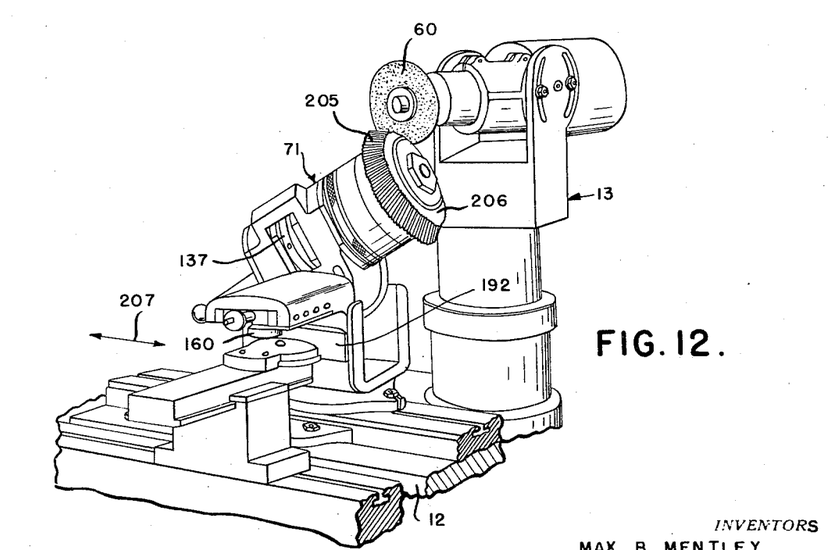
Figure 12 is a fragmentary perspective of the grinding machine illustrating the arrangement thereof for performing still another grinding operation.

In Figures 11 and 12 we have illustrated two different set-ups. In Figure 11 we illustrate a work piece 200, and the operation being performed is the grinding of the sides of straight teeth 201. For this purpose the work spindle assembly 71 has been adjusted so that its axis extends upwardly at such an angle that the side surfaces of the teeth 201 extend horizontally. The axis of the grinding wheel 60 is horizontal and has been adjusted around a vertical axis to conform to the work. Since the operation illustrated is the grinding of straight teeth, the generating sine bar attachment has been disconnected and the work spindle 90 has been locked in adjusted position by tightening the bolt 140 illustrated in Figure 10. To perform the grinding operation, the slide 12 is reciprocated in the direction of the arrow 202.

In Figure 12 we have illustrated a different arrangement for grinding helical teeth 205 of a bevel cutter 206. In this case, in order to generate helical teeth, it is necessary to connect up the sine bar mechanism, and in this figure we have illustrated the roll 160 as in contact with the sine bar 192. In this case clamping bolt 140 (Figure 10) has been released and the spindle 90 is connected to drive the work piece 206 through the indexing mechanism, including the index plate 91 and the index finger 106 (Figure 9). The work spindle assembly 71 is adjusted around so that the tooth surfaces being worked on will pass in a horizontal plane relative to the grinding wheel 60, due to the generating roll imparted to the work piece 205. The grinding operation comprises reciprocating the work piece in the direction of the arrow 207, which will result in moving the work piece past the grinding wheel 60 with a generating roll imparted thereto through the medium of the tape 137.

Referring now to Figure 1, attention is directed to an important feature of novelty of the present apparatus. The grinder 60 is mounted for angular adjustment in the support 13 about the axis of trunnion bearings 56. Mounted directly upon the tool spindle support 58 is a trimmer fixture indicated generally at 210. This trimmer support is mounted for vertical adjustment relative to the axis of the grinder 60 on posts 211, and the trimming mechanism is adjustable on arms 212. Trimmer points are carried by blocks 213 so that the wheel may be trimmed when necessary without traversing trimming mechanism to the grinding zone as is present practice today. This facilitates trimming of the wheel and expedites the whole grinding process. It will be appreciated, of course, that after trimming the wheel the same will be fed downwardly, as for example by suitable adjustment by means of the handwheel 44 in Figure 2 to retain the desired relationship between the wheel and the work.

The present machine may be employed to manufacture a milling cutter of the type referred to from a tool blank, or it may be employed to finish grind a cutter previously milled to approximate dimensions. The operations involve grinding the periphery of the cutter to establish concentricity, after which the teeth may be gummed out, or if previously milled, may be finished ground. This operation establishes the hook in front of the cutting edge and finishes the tooth spaces. It leaves a substantially unrelieved land directly in back of the cutting edge. By employing the present machine, this land back of the cutting edge may be relieved to any extent desired, this relief being provided in a helical path where the cutter teeth are helical. It is possible to relieve the tops of the cutter teeth in such a manner as to leave a narrow unrelieved land directly in back of the cutting edge, which will be uniform from end to end. This may also be done in resharpening cutter teeth. The same machine is adaptable for manufacturing or finish grinding cylindrical or conical cutters, either of which may have either straight or inclined, or helical teeth, as desired.

While we have illustrated and described a specific grinding machine, it will be understood that this has been done merely to enable those skilled in the art to practice the invention, the scope of which is indicated by the appended claims.

What we claim as our invention is:

1. A grinder comprising a base, a column vertically adjustable on said base, a yoke mounted on said column for adjustment about a vertical axis, and a grinding wheel and drive means therefor swiveled between the arms of said yoke for adjustment about a horizontal axis, a slide on said base adjustable toward and away from said column, a bracket mounted on said slide for adjustment about a vertical axis, a work spindle mounted on said bracket for adjustment about a horizontal axis, means for translating said slide in a direction perpendicular to its aforementioned adjustment, and means responsive to translation of said slide for rotating said spindle.

2. A grinder comprising a base, a column vertically adjustable on said base, a yoke mounted on said column for adjustment about a vertical axis, and a grinding wheel and drive means therefor swiveled between the arms of said yoke for adjustment about a horizontal axis, a slide on said base adjustable toward and away from said column, a bracket mounted on said slide for adjustment about a vertical axis, a work spindle mounted on said bracket for adjustment about a horizontal axis, means for translating said slide in a direction perpendicular to its aforementioned adjustment, and means responsive to translation of said slide for rotating said spindle, said means comprising a sine bar carried by said frame, a roll connected to said spindle, and a tape secured to said roll and operated by said sine bar.

3. In a machine of the character described, a frame, a sine bar on said frame, a spindle support mounted for rectilinear traverse on said frame, a rotary spindle therein, an arm extending from said support toward said sine bar, ways in said arm, a member slidably mounted in said ways, a roller carried by said member engageable with said sine bar, a roll connected to said spindle, and a tape one end of which is adjustably connected to said member, the other end of said tape extending partly around said roll and secured thereto, said one end of said tape being connected to said member for adjustment relative thereto in a direction parallel to the direction of sliding of said member.

4. In a machine of the character described, a spindle having a roll secured thereto, a support for said spindle having a portion providing ways extending perpendicular to said spindle, a sine bar located adjacent said ways, a member slidable in said ways having a part engageable with said sine bar, a threaded element slidably associated with said member, a nut for said element operable to adjust said element longitudinally of said member, a tape secured to said element at one end, the other end of said tape being extended partly around said roll and secured thereto.

5. In a machine of the character described, a frame, a spindle having a generating roll secured thereto, a spindle support mounting said spindle on said frame for adjusting said spindle about an axis perpendicular to the spindle axis and substantially tangent to said roll, a tape having an end portion wound partly around said roll and secured thereto and having its opposite end portion extending substantially along the axis of adjustment of said spindle support, and means for moving said tape longitudinally to effect rotation of said spindle.

6. In a machine of the character described, a frame, a spindle having a generating roll secured thereto, a spindle support mounting said spindle on said frame for adjusting said spindle about an axis perpendicular to the spindle axis and substantially tangent to said roll, a tape having an end portion wound partly around said roll and secured thereto and having its opposite end portion extending substantially along the axis of adjustment of said spindle support, a member relatively movable toward and away from said spindle along said last mentioned axis, and a swivel connection between said member and the said other end of said tape.

7. In a machine of the character described, a frame, a spindle having a generating roll secured thereto, a spindle support mounting said spindle on said frame for adjusting said spindle about an axis perpendicular to the spindle axis and substantially tangent to said roll, a tape having an end portion wound partly around said roll and secured thereto and having its opposite end portion extending substantially along the axis of adjustment of said spindle support, a guideway extending substantially along said last mentioned axis, a member slidable in said guideway toward and away from said roll, an element adjustable longitudinally of said member, and a swivel connection between said element and the other end of said tape.

8. In a machine of the character described, a frame, a spindle having a generating roll secured thereto, a spindle support mounting said spindle on said frame for adjusting said spindle about an axis perpendicular to the spindle axis and substantially tangent to said roll, a tape having an end portion wound partly around said roll and secured thereto and having its opposite end portion extending substantially along the axis of adjustment of said spindle support, a guideway extending substantially along said last mentioned axis, a member slidable in said guideway toward and away from said roll, an element adjustable longitudinally of said member, a swivel connection between said element and the other end of said tape, a sine bar on said frame, said member having a portion engageable with said sine bar, and means for relatively traversing said sine bar and support to effect rotation of said spindle.

9. In a machine of the character described, a spindle having a generating roll secured thereto, a support for said spindle, a spring housing having a core keyed to said spindle and an outer shell locked to said support, a coil spring in said shell surrounding said core and connected at its ends to said core and shell.

10. In a machine of the character described, a spindle having a generating roll secured thereto, a support for said spindle, a spring housing having a core keyed to said spindle and an outer shell locked to said support, a coil spring in said shell surrounding said core and connected at its ends to said core and shell, said outer shell and said support having interfitting portions, a clamp carried by said support and arranged to interlock said shell and said support by applying pressure between said interfitting portions.

11. In a machine of the character described, a spindle having a generating roll secured thereto, a support for said spindle, an index plate and work support mounted for rotation on said spindle, indexing means mounted on said spindle including an index finger cooperable with said plate, and releasable clamping means carried by said spindle for locking said index plate to said spindle, said spindle being hollow, and said clamping means comprising a rod extending through said spindle having an abutment at one end engageable with said index plate and work support, said spindle having a radial flange adjacent said index plate and work support, and camming means at the other end of said rod for moving said rod axially of said spindle to apply frictional clamping pressure between said index plate and work support and said radial flange.

12. A universal grinding machine comprising a frame, a grinder support on said frame mounted for vertical adjustment and for adjustment about a vertical axis, a grinding wheel on said support mounted for adjustment about a horizontal axis, a work slide on said frame adjustable horizontally toward and away from said grinder support, and mounted for operating traverse horizontally in a direction perpendicular to the direction of its horizontal adjustment, a work spindle bracket mounted on said slide for adjustment about a horizontal axis perpendicular to the axis of said spindle, a spindle in said bracket having a generating roll secured thereto, the periphery of said generating roll being tangent to the axis of adjustment of said bracket, a sine bar on said frame mounted for adjustment toward and away from said work slide and adjustable about a vertical axis to vary its inclination to the path of traverse of said slide, means carried by said slide movable toward and away from said spindle along the axis of adjustment of said bracket operatively engaging said roll in various positions of adjustment of said bracket and engaging said sine bar.

13. A universal grinding machine comprising a frame, a grinder support on said frame mounted for vertical adjustment and for adjustment about a vertical axis, a grinding wheel on said support mounted for adjustment about a horizontal axis, a work slide on said frame adjustable horizontally toward and away from said grinder support, and mounted for operating traverse horizontally in a direction perpendicular to the direction of its horizontal adjustment, a work spindle bracket mounted on said slide for adjustment about a horizontal axis perpendicular to the axis of said spindle, a spindle in said bracket having a generating roll secured thereto, the periphery of said generating roll being tangent to the axis of adjustment of said bracket, a sine bar on said frame mounted for adjustment toward and away from said work slide and adjustable about a vertical axis to vary its inclination to the path of traverse of said slide, means carried by said slide movable toward and away from said spindle along the axis of adjustment of said bracket operatively engaging said roll in various positions of adjustment of said bracket and engaging said sine bar, said means comprising a member having a portion engaging said sine bar, and a tape interconnecting said member and said roll.

14. A universal grinding machine comprising a frame, a grinder support on said frame mounted for vertical adjustment and for adjustment about a vertical axis, a grinding wheel on said support mounted for adjustment about a horizontal axis, a work slide on said frame adjustable horizontally toward and away from said grinder support, and mounted for operating traverse horizontally in a direction perpendicular to the direction of its horizontal adjustment, a work spindle bracket mounted on said slide for adjustment about a horizontal axis perpendicular to the axis of said spindle, a spindle in said bracket having a generating roll secured thereto, the periphery of said generating roll being tangent to the axis of adjustment of said bracket, a sine bar on said frame mounted for adjustment toward and away from said work slide and adjustable about a vertical axis to vary its inclination to the path of traverse of said slide, means carried by said slide movable toward and away from said spindle along the axis of adjustment of said bracket operatively engaging said roll in various positions of adjustment of said bracket and engaging said sine bar, said means comprising a member having a portion engaging said sine bar, and a tape swiveled to and longitudinally adjustable relative to said member, and connected at its other end to said roll.

15. In a machine of the character described, a spindle housing, a spindle mounted for rotation therein, a radial flange on said spindle, a support rotatably mounted on said spindle adjacent said flange, an index plate rigidly secured to said support, and a spring-pressed index finger carried by said flange and positioned to cooperate with recesses in said index plate.

16. In a machine of the character described, a spindle housing, a spindle mounted for rotation therein, a generating roll keyed to said spindle, a tape extending partly around said roll and secured thereto, means for moving said tape relative to said roll along a line of action tangential to said roll to impart rotation to said spindle, and supporting means mounting said spindle housing for pivotal adjustment about an axis substantially coincident with said line of action.

17. In a machine of the character described, a spindle housing, a spindle mounted for rotation therein, a generating roll keyed to said spindle, a tape extending partly around said roll and secured thereto, means for moving said tape relative to said roll along a line of action tangential to said roll to impart rotation to said spindle, said last means comprising a sine bar device including a member movable along said line of action, a swivel connection between said member and said tape, and supporting means mounting said spindle housing for pivotal adjustment about an axis substantially coincident with said line of action.

18. In a machine of the character described, a spindle having a generating roll secured thereto, tape means for controlling rotation of said spindle, a support for said spindle, a phonograph-type spring secured at one end to said spindle, a case for said spring to which the other end of said spring is secured, and releasable means for securing said case against rotation relative to said support.

MAX B. MENTLEY.
DONALD D. AUSTIN.